(12) United States Patent
Tsuda

(10) Patent No.: US 9,821,376 B2
(45) Date of Patent: Nov. 21, 2017

(54) CUTTING INSERT, CUTTING TOOL, AND METHOD FOR MANUFACTURING MACHINED PRODUCT

(71) Applicant: KYOCERA Corporation, Kyoto-shi, Kyoto (JP)

(72) Inventor: Yuichi Tsuda, Yasu (JP)

(73) Assignee: KYOCERA Corporation, Kyoto-Shi, Kyoto (JP)

( * ) Notice: Subject to any disclaimer, the term of this patent is extended or adjusted under 35 U.S.C. 154(b) by 0 days.

(21) Appl. No.: 15/120,012

(22) PCT Filed: Feb. 26, 2015

(86) PCT No.: PCT/JP2015/055726
§ 371 (c)(1),
(2) Date: Aug. 18, 2016

(87) PCT Pub. No.: WO2015/129836
PCT Pub. Date: Sep. 3, 2015

(65) Prior Publication Data
US 2017/0066060 A1 Mar. 9, 2017

(30) Foreign Application Priority Data

Feb. 26, 2014 (JP) .................................. 2014-035513
Oct. 29, 2014 (JP) .................................. 2014-220405

(51) Int. Cl.
*B23B 27/00* (2006.01)
*B23B 27/14* (2006.01)
*B23B 27/04* (2006.01)

(52) U.S. Cl.
CPC .......... *B23B 27/145* (2013.01); *B23B 27/045* (2013.01); *B23B 27/141* (2013.01); *B23B 2200/087* (2013.01); *B23B 2200/369* (2013.01)

(58) Field of Classification Search
CPC ... B23B 27/145; B23B 27/045; B23B 27/141; B23B 27/143; B23B 2200/087;
(Continued)

(56) References Cited

U.S. PATENT DOCUMENTS 3,557,416 A * 1/1971 Jones .................... B23B 27/143
407/114
4,840,518 A * 6/1989 Plutschuck ........... B23B 27/145
407/113

(Continued)

FOREIGN PATENT DOCUMENTS

JP S62-121004 U 7/1987
JP H02-145903 U 12/1990
(Continued)

OTHER PUBLICATIONS

International Search Repot (Form PCT/ISA/210) dated May 19, 2015 and issued for PCT/JP2015/055726.

*Primary Examiner* — Will Fridie, Jr.
(74) *Attorney, Agent, or Firm* — Volpe and Koenig, P.C.

(57) ABSTRACT

A cutting insert (1) includes a top surface (6), a side surface, a rake face (10) on the top surface (6), a front flank face (11) and a lateral flank face (12), a cutting edge (9) including a front cutting edge (13), and a lateral cutting edge (14), a breaker groove (15) adjacent to the front cutting edge (13) and the lateral cutting edge (14), and a rake face end (20). The breaker groove (15) includes a descending surface (16) and an ascending surface (17). The ascending surface (17) includes a front wall surface (21) and a lateral wall surface (22) on the side of the front cutting edge (13) and the side of the lateral cutting edge (14). An opening angle (θ1) of the front wall surface (21) is greater than an opening angle (θ2) of the lateral wall surface (22) in the top surface (6) view.

19 Claims, 13 Drawing Sheets

(58) Field of Classification Search
CPC ...... B23B 2200/369; B23B 2200/0423; B23B 2200/0447; B23C 5/207; B23C 5/12; B23C 2210/205; B23C 2200/0433; B23C 2200/201
See application file for complete search history.

(56) References Cited

U.S. PATENT DOCUMENTS

| | | | | |
|---|---|---|---|---|
| 5,876,160 | A * | 3/1999 | Johnson | B23C 5/202 407/113 |
| 6,595,092 | B1 * | 7/2003 | Taniguchi | B23B 27/06 407/114 |
| 2004/0091329 | A1 * | 5/2004 | Chang | B23B 27/145 408/233 |
| 2007/0059111 | A1 * | 3/2007 | Deitert | B23C 5/207 407/113 |
| 2009/0279962 | A1 * | 11/2009 | Dufour | B23C 5/207 407/37 |
| 2011/0044776 | A1 * | 2/2011 | Ishi | B23B 27/145 408/1 BD |
| 2013/0149057 | A1 * | 6/2013 | Nisikawa | B23B 51/048 408/83 |
| 2013/0177360 | A1 * | 7/2013 | Hecht | B23C 5/207 407/113 |
| 2014/0199128 | A1 * | 7/2014 | Hecht | B23B 27/04 407/103 |

FOREIGN PATENT DOCUMENTS

| | | |
|---|---|---|
| JP | H09-314407 A | 12/1997 |
| JP | 2000-280107 A | 10/2000 |
| JP | 2006-110667 A | 4/2006 |
| JP | 2012-250296 A | 12/2012 |
| WO | 2011/037186 A | 3/2011 |

* cited by examiner

CUTTING INSERT, CUTTING TOOL, AND METHOD FOR MANUFACTURING MACHINED PRODUCT

TECHNICAL FIELD

The present invention relates to a cutting insert, a cutting tool mounted to a holder, and a method for manufacturing a machined product.

BACKGROUND ART

Cutting tools for forming grooves and performing back turning have been widely used. Such cutting tools may include a breaker groove on a rake face of a cutting insert used in the cutting tool. This breaker groove is for smoothly discharging chips produced when cutting a work material from a cutting portion. The breaker groove is basically disposed so that chips extending from a cutting edge cross the breaker groove. A descending surface on the side of the cutting edge of the breaker groove draws the chips into the breaker groove. An ascending surface on the side opposite the side of the cutting edge of the breaker groove is a wall section into which the chips, having been drawn into the breaker groove, collide, causing the wall section to deform the chips. The deformed chips are quickly discharged from the vicinity of the cutting edge of the cutting tool.

For example, Patent Document 1 discloses a cutting insert (throw-away tip) 40 for back turning that includes a breaker groove 41 on a rake face 42 such as illustrated in FIG. 13. The breaker groove 41 of Patent Document 1 includes an insular portion 43 having a flat height and disposed in a position adjacent to the breaker groove 41 of the rake face 42. The insular portion 43 increasingly narrows on the side of the front cutting edge 44 and has an acute angle shape on the side of the front cutting edge 44.

When back turning is performed using the cutting insert 40 of Patent Document 1, first the cutting edge (the front cutting edge 44 and a lateral cutting edge 45) is advanced in a direction perpendicular to a machined surface of the work material by a distance equivalent to the cut amount, and then machining is performed while advancing the cutting edge rearward. As a result, during back turning, many chips are produced from the side of the front cutting edge 44 when cutting is started during the initial stage, and many chips are produced from the side of the lateral cutting edge 45 when the cutting edge is subsequently advanced rearward. Furthermore, before back turning, groove-forming while advancing the cutting edge frontward may also be performed and, in this case as well, many chips are produced from the side of the front cutting edge 44.

When such a cutting insert 40 that includes the insular portion 43 having a frontward acute angle shape as that in Patent Document 1 is used, the advancing direction of the chips produced from the side of the front cutting edge 44 during the initial stage of back turning and during groove-forming is nearly parallel to the breaker groove 41. In Patent Document 1, the height of the insular portion 43 is greater than a height of the front cutting edge 44 and the lateral cutting edge 45 so that the chips produced during back turning do not pass over the breaker groove 41.

CITATION LIST

Patent Literature

Patent Document 1: Japanese Unexamined Patent Application Publication No. 2012-250296A

SUMMARY OF INVENTION

Technical Problem

Nevertheless, in the cutting insert 40 of Patent Document 1, the chips produced from the side of the front cutting edge 44 may not readily deform due to an inability to pass along the descending surface and the ascending surface of the breaker groove 41 in sequence, causing the chips to extend and accumulate near the front cutting edge 44 and the lateral cutting edge 45 and not readily discharge outside a machining portion.

Solution to Problem

A cutting insert of the present embodiment includes a top surface, a side surface, a rake face located on the top surface, a front flank face and a lateral flank face, both located on the side surface, a cutting edge including a front cutting edge located at a crossing ridge portion between the rake face and the front flank face, and a lateral cutting edge located at a crossing ridge portion between the rake face and the lateral flank face, a breaker groove on the rake face, adjacent to the front cutting edge and the lateral cutting edge, and a rake face end located on a side opposite the lateral cutting edge of the rake face. The breaker groove includes a descending surface and an ascending surface disposed in sequence from a side of the front cutting edge and a side of the lateral cutting edge, respectively, a front wall surface disposed on the ascending surface of the breaker groove on the side of the front cutting edge, and facing the front cutting edge, and a lateral wall surface disposed on the ascending surface of the breaker groove on the side of the lateral cutting edge, and facing the lateral cutting edge. An opening angle $\theta 1$ from the rake face end of the front wall surface is greater than an opening angle $\theta 2$ from the rake face end of the lateral wall surface in the top surface view.

A cutting tool of the present embodiment is a tool including a holder and the cutting insert mounted to an insert attachment space provided to a tip of a holder.

A method for manufacturing a machined product of the present embodiment includes rotating a work material, bringing a cutting edge of the cutting tool into contact with the work material that is rotating, and separating the cutting tool from the work material.

Advantageous Effects of Invention

According to the present embodiment, the chip-deforming effect on the chips produced in high quantities from the side of the front cutting edge during the initial stage of back turning and during groove-forming by the front wall surface having a large opening angle $\theta 1$ is large, resulting in easy chip discharge. Further, the chip-deforming effect on the chips produced in high quantities from the side of the lateral cutting edge when machining is performed while advancing the cutting edge rearward by the lateral wall surface having a small opening angle $\theta 2$ is large, resulting in easy chip discharge. As a result, the chips can be smoothly discharged at every phase of machining.

DESCRIPTION OF EMBODIMENTS

Figure 1:
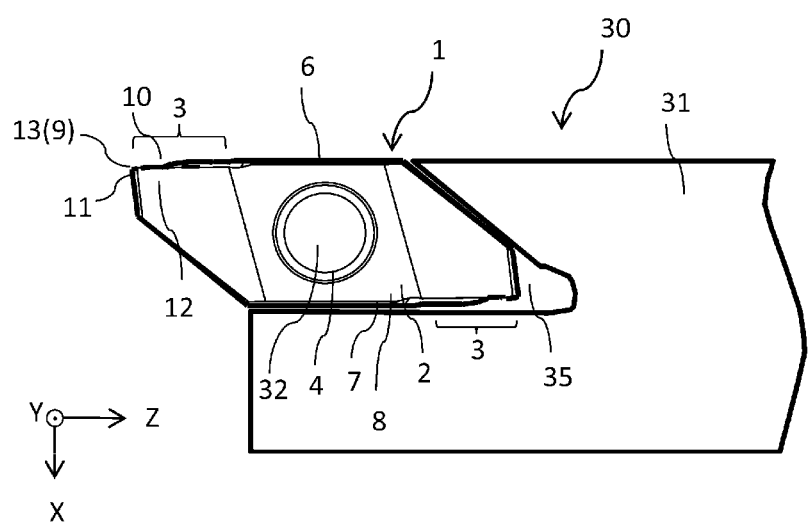
FIG. 1 is a side view illustrating an example of a cutting tool including a holder and a cutting insert of an embodiment mounted to the holder.
Figure 2A:
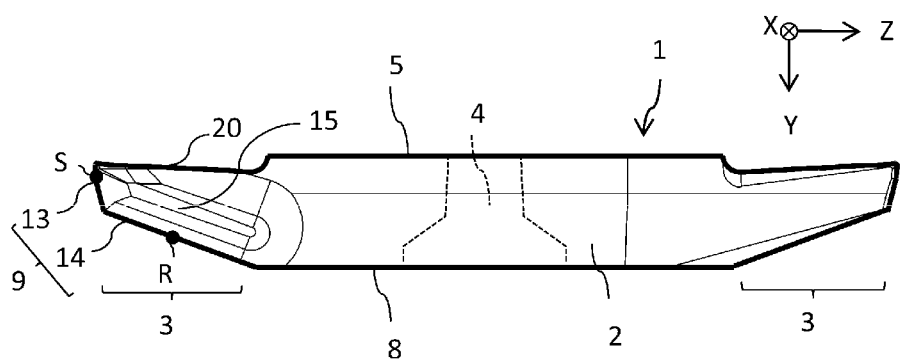
FIG. 2A is a top view of the cutting insert of a first embodiment mounted to the cutting tool in FIG. 1 in the direction X.
Figure 2B:
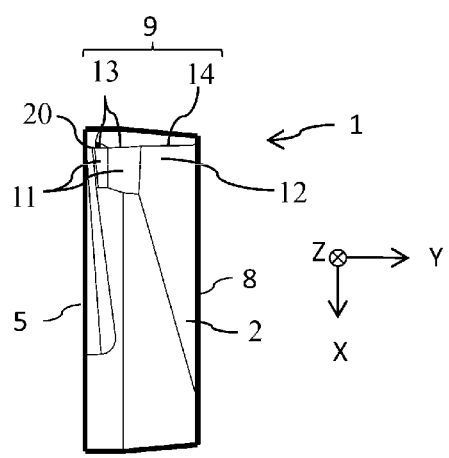
FIG. 2B is a side view of the cutting insert in the direction Z.

The following describes a cutting insert and a cutting tool of a present embodiment on the basis of FIGS. 1 to 4B.

A cutting insert (hereinafter referred to as "insert") 1 includes an insert body 2 and a cutting edge portion 3. The insert body 2 is provided with a main surface having a substantially parallelogram shape. A center portion of the main surface has a rectangular shape. A width of an end portion side of the main surface is tapered. The cutting edge portion 3 is disposed to an acute angle portion on the tapered end portion side of the insert body 2. In the present embodiment, the side through which chips pass during cutting, that is, the side of a rake face 10 of the cutting insert 1 described later, is defined as a top side. Thus, the main surface is a side surface. In the present embodiment, the insert 1 includes the cutting edge portion 3 at both ends of the insert body 2. That is, the insert 1 includes two cutting edge portions 3. The insert 1 further includes a through-hole 4 for screw-fastening. The trough-hole 4 passes through the center portion of the side surface having a rectangular shape (main surface).

The insert 1 is mounted to an insert pocket 35 provided to a tip of a holder 31, and is used as a cutting tool 30. Specifically, a first side surface 5 in the center portion of one side surface, and a bottom surface 7 on a side opposite a top surface 6 of the insert body 2 adjacent to one of the cutting edge portions 3 are restrained by the holder 31, and the insert 1 is fixed by a screw 32. The screw 32 is inserted from a second side surface 8, which serves as the other side surface of the insert 1, through the through-hole 4, and screwed into the holder 31, thereby fixing the screw 32 to the holder 31 and the insert 1 to the holder 31. When the other cutting edge portion 3 is to be used for cutting, the top surface 6 and the bottom surface 7 of the insert body 2 are switched.

The cutting edge portion 3 includes the rake face 10 located on the top surface 6, a front flank face 11 located on the side of the first side surface 5 in the direction Z (frontward) of the side surface, a lateral flank face 12 located on the side of the second side surface 8 and adjacent to the front flank face 11, a front cutting edge 13 located at a crossing ridge portion between the rake face 10 and the front flank face 11, a lateral cutting edge 14 located at a crossing ridge portion between the rake face 10 and the lateral flank face 12, a breaker groove 15 on the rake face 10, adjacent to the front cutting edge 13 and the lateral cutting edge 14, and a rake face end (so-called "back taper") 20 located on the side opposite the lateral cutting edge 14 of the rake face 10. That is, a cutting edge 9 of the insert 1 is formed by the front cutting edge 13 and the lateral cutting edge 14. In the present embodiment, the front cutting edge 13 is formed by a first front cutting edge 13a on the side of the rake face end 20, and a second front cutting edge 13b on the side of the lateral cutting edge 14.

Figure 4A:
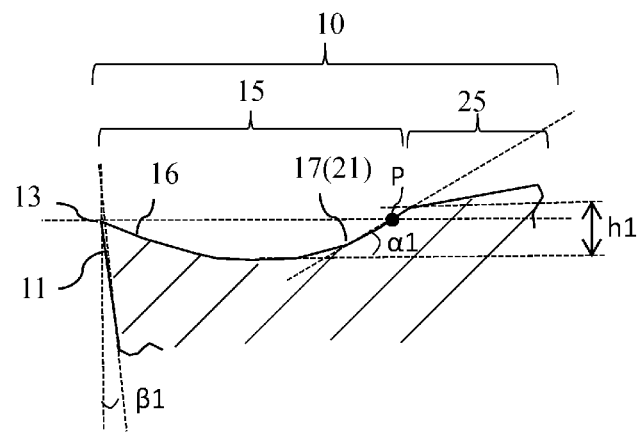
FIG. 4A is an A-A cross-sectional view orthogonal to a frontmost position S of a front cutting edge of the cutting insert in FIG. 3.
Figure 4B:
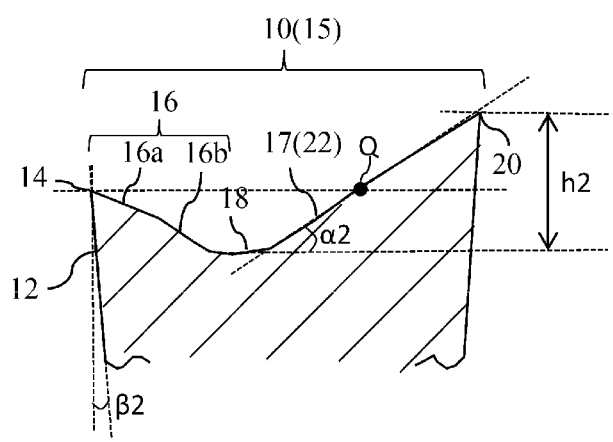
FIG. 4B is a B-B cross-sectional view orthogonal to an intermediate position R of a lateral cutting edge of the cutting insert.
Figure 5:
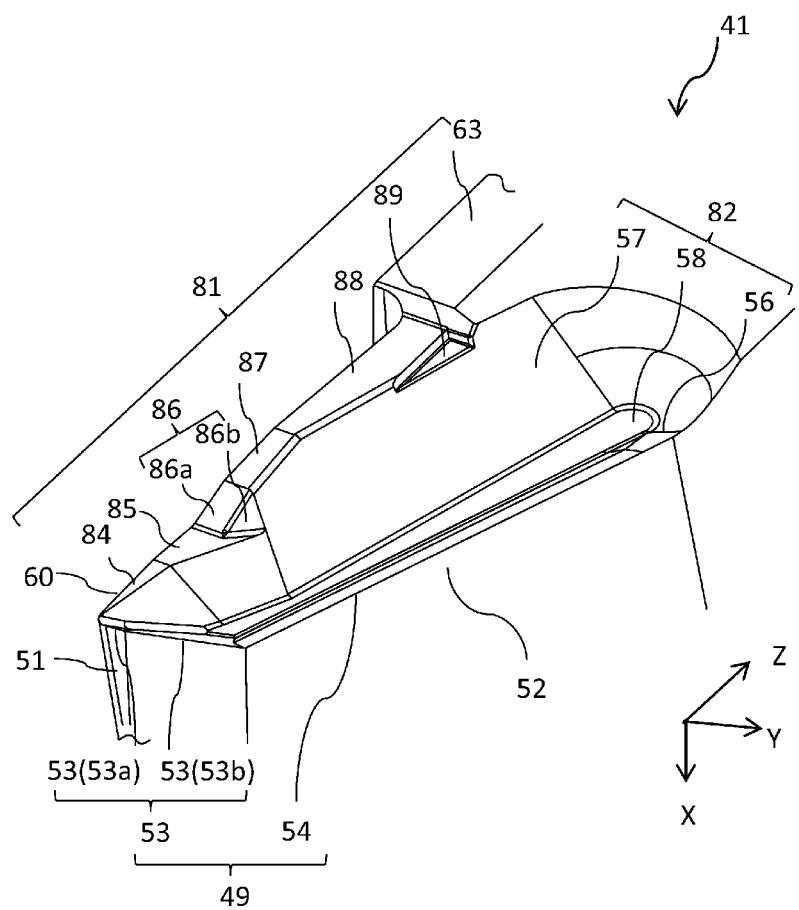
FIG. 5 is an enlarged perspective view of the main part of the cutting insert of a second embodiment mounted to the cutting tool in FIG. 1.
Figure 6A:
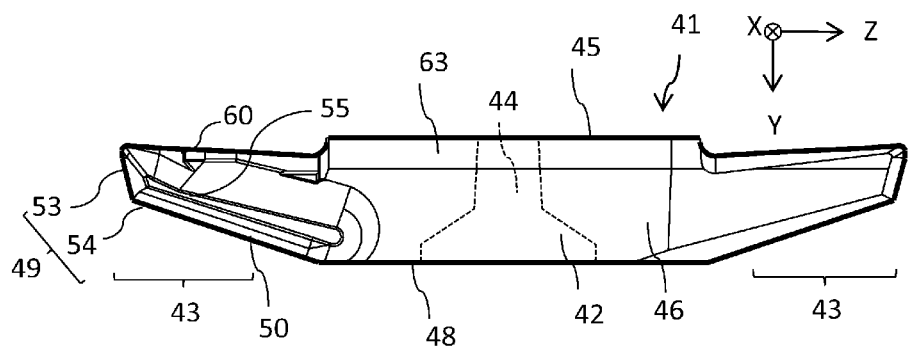
FIG. 6A is a top view of the cutting insert in FIG. 5 in the direction X.
Figure 6B:
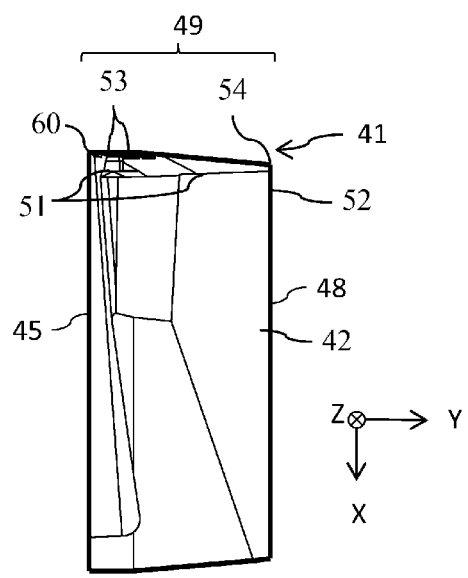
FIG. 6B is side view of the cutting insert in the direction Z.

A tip of the rake face end 20 is connected to the front cutting edge 13. A rear end of the rake face end 20 is adjacent to the first side surface 5 of the insert body 2. As illustrated in FIGS. 4A and 4B, the front flank face 11 intersects the rake face 10 at an angle of a clearance angle $\beta1$, and the lateral flank face 12 intersects the rake face 10 at an angle of a clearance angle $\beta2$.

As illustrated in FIGS. 4A and 4B, the breaker groove 15 includes a descending surface 16 and an ascending surface 17 disposed in sequence from the side of the cutting edge 9 (the side of the front cutting edge 13 and the lateral cutting edge 14). The ascending surface 17 of the breaker groove 15 on the side of the front cutting edge 13 includes a front wall surface 21 facing the front cutting edge 13, and the ascending surface 17 of the breaker groove 15 on the side of the lateral cutting edge 14 includes a lateral wall surface 22 facing the lateral cutting edge 14. In other words, the ascending surface 17 of the breaker groove 15 on the side of the front cutting edge 13 includes the front wall surface 21 that faces the front cutting edge 13 and is at a position of height that is the same as the height of the front cutting edge 13, and the ascending surface 17 of the breaker groove 15 on the side of the lateral cutting edge 14 includes the lateral wall surface 22 that faces the lateral cutting edge 14 and is at a position of height that is the same as the height of the lateral cutting edge 14.

Figure 3:
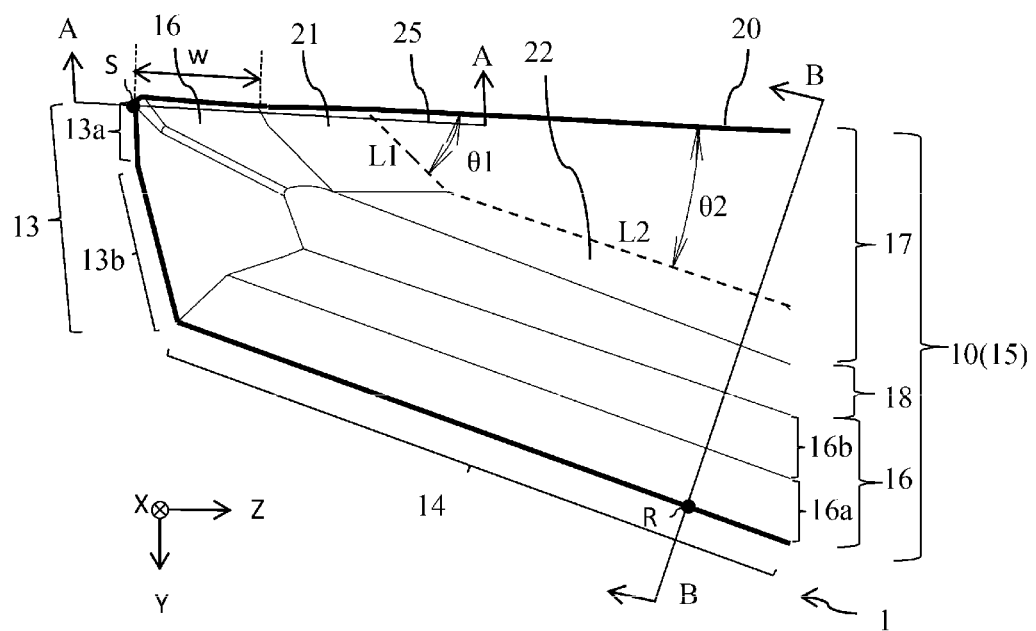
FIG. 3 is an enlarged view of a main part of the cutting insert in FIG. 2A.

According to the present embodiment, as illustrated in FIG. 3, an opening angle $\theta1$ from the rake face end 20 of the front wall surface 21 in the top surface 6 view of the insert 1 (hereinafter also abbreviated "opening angle $\theta1$") is greater than an opening angle $\theta2$ from the rake face end 20 of the lateral wall surface 22 (hereinafter, also abbreviated "opening angle $\theta2$"). Thus, the chip-deforming effect by the front wall surface 21 on the chips produced in high quantities from the front cutting edge 13 side during the initial stage of back turning and during groove-forming is large, resulting in easy chip discharge. Further, the chip-deforming effect by the lateral wall surface 22 on the chips produced in high quantities from the lateral cutting edge 14 side when machining is performed while advancing the cutting edge rearward is large, resulting in easy chip discharge. As a result, the chips can be smoothly discharged at every phase of machining.

Note that, in the present embodiment, the opening angle θ1 of the front wall surface 21 is defined as the angle between a line L1 (the dashed line in FIG. 3) and the rake face end 20. The line L1 connects positions P at the same height as the height of the front cutting edge 13 of the front wall surface 21 illustrated in FIG. 4A as viewed from above as in FIG. 3. The opening angle θ2 of the lateral wall surface 22 is defined as the angle between a line L2 (the dashed line in FIG. 3) and the rake face end 20. The line L2 connects positions Q at the same height as the height of the lateral cutting edge 14 of the lateral wall surface 21 illustrated in FIG. 4B as viewed from above as in FIG. 3.

In the present embodiment, the opening angle θ1 of the front wall surface 21 is from 5 to 40°, and the opening angle θ2 of the lateral wall surface 22 is from 2 to 30°. When the opening angles θ1, θ2 are within these ranges, the chips readily deform both during the initial stage and later stages of back turning. The particularly preferred range of the opening angle θ1 is from 10 to 20°, and the particularly preferred range of the opening angle θ2 is from 5 to 15°.

According to the present embodiment, on the side of the front cutting edge 13 in FIG. 4A, the breaker groove 15 is smoothly connected from the descending surface 16 across the ascending surface 17 in a curved shape, and the ascending surface 17 includes the front wall surface 21 having a large rising angle α1. The rake face 10 includes a rear connecting surface 25 rearward from the front wall surface 21 of the breaker groove 15. This rear connecting surface 25 has a small rising angle. On the side of the lateral cutting edge 14 in FIG. 4B, the breaker groove 15 includes a breaker bottom surface 18 between the descending surface 16 and the ascending surface 17. The descending surface 16 on the side of the lateral cutting edge 14 includes a first descending surface 16a having a small downward angle, and a second descending surface 16b having a large downward angle from the side of the lateral cutting edge 14. The ascending surface 17 of the breaker groove 15 on the side of the lateral cutting edge 14 is formed by the lateral wall surface 22 only. Note that, in the present embodiment, the breaker groove 15 may include negative land portions between the front cutting edge 13 and the descending surface 16, and between the lateral cutting edge 14 and the descending surface 16. Further, the rake face 10 may include a rear connecting surface having a small rising angle adjacent to the lateral wall surface 22, rearward from the ascending surface 17 on the side of the lateral cutting edge 14.

In the present embodiment, the rising angle α1 of the front wall surface 21 is from 20 to 35°, and the rising angle α2 of the lateral wall surface 22 is from 15 to 35°. When the rising angles α1, α2 are within these ranges, the chips readily deform both during the initial stage and later stages of back turning. The particularly preferred range of the rising angle α1 is from 25 to 30°, and the particularly preferred range of the rising angle α2 is from 20 to 30°.

Further, in the present embodiment, a ratio (h2/h1) of a height (h2) of the lateral wall surface 22 to a height (h1) of the front wall surface 21 is from 1 to 8. When the ratio (h2/h1) is within this range, the chips readily deform both during the initial stage and later stages of back turning. The particularly preferred range of the ratio (h2/h1) is from 3 to 5.

The height h1 of the front wall surface 21 in the present embodiment refers to the difference between the heights of a lowermost position of the breaker groove 15 and a highermost position (a connecting portion with the rear connecting surface 25 of the front wall surface 21 in FIG. 4A) of the front wall surface 21, in a cross section orthogonal to the front cutting edge 13 at a point S in a frontmost position of the front cutting edge 13. The height h2 of the lateral wall surface 22 refers to the difference between the heights of a lowermost position (the breaker bottom surface 18 in FIG. 4B) of the breaker groove 15 and a highermost position (the rake face end 20 in FIG. 4B) of the lateral wall surface 22, in a cross section orthogonal to the lateral cutting edge 14 at a point R in an intermediate position on the lateral cutting edge 14. The height reference is the bottom surface 7 that serves as a seating face when the insert 1 is mounted to the holder 31.

Further, in the present embodiment, a ratio (w1/h1) of a length (w1) to the height (h1) of the front wall surface 21 is from 2 to 10, where the length (w1) is a length of the descending surface 16 of the breaker groove 15 at the point S in the frontmost position of the front cutting edge 13. When the ratio (w1/h1) is within this range, the chips produced from the side of the front cutting edge 13 can be drawn into the breaker groove 15 and thus readily deform. The particularly preferred range of the ratio (w1/h1) is from 3.2 to 5.3.

Second Embodiment

The following describes a cutting insert and a cutting tool of a second embodiment on the basis of FIGS. 5 to 11.

A cutting insert (insert) 41, similar to the first embodiment, includes an insert body 42, a cutting edge portion 43, a through-hole 44, a first side surface 45, a top surface 46, a bottom surface 47, a second side surface 48, a rake face 50, a front flank face 51, a lateral flank face 52, a front cutting edge 53, a first front cutting edge 53a, a second front cutting edge 53b, a lateral cutting edge 54, a breaker groove 55, a rake face end 60, and a middle surface 63.

Figure 9A:
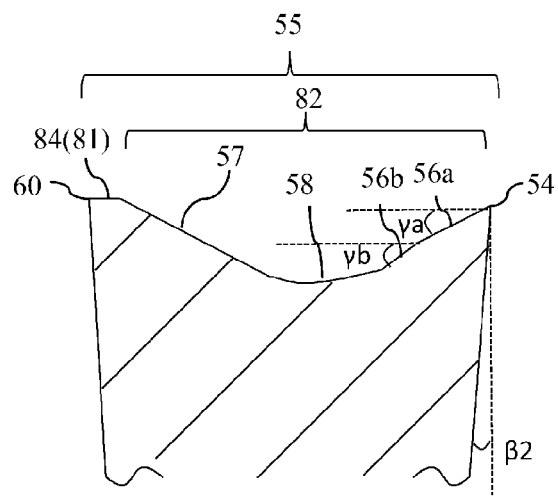
FIG. 9A is an A-A cross-sectional view of the cutting insert in FIG. 7.
Figure 9B:
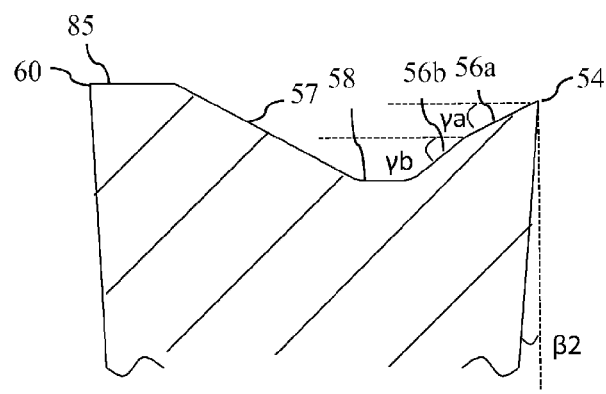
FIG. 9B is a B-B cross-sectional view of the cutting insert in FIG. 7.
Figure 9C:
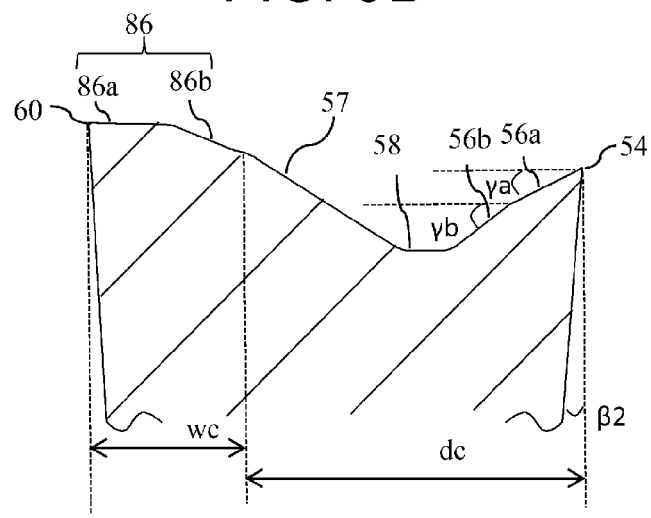
FIG. 9C is a C-C cross-sectional view of the cutting insert in FIG. 7.

According to the present embodiment, in a cross section orthogonal to the rake face end 60 in FIGS. 9A to 9C, the breaker groove 55 includes a base portion 81 and a groove portion 82. The base portion 81 is adjacent to the rake face end 60. The groove portion 82 is adjacent to the base portion 81, extends to the cutting edge 49, and includes a bend point 66 between itself and the base portion 81. Then, as illustrated in FIGS. 9A to 10B, the breaker groove 55 further includes a descending surface 56 and an ascending surface 57 disposed in sequence as viewed from the side of the cutting edge 49 (the side of the front cutting edge 53 and lateral cutting edge 54).

Figure 7:
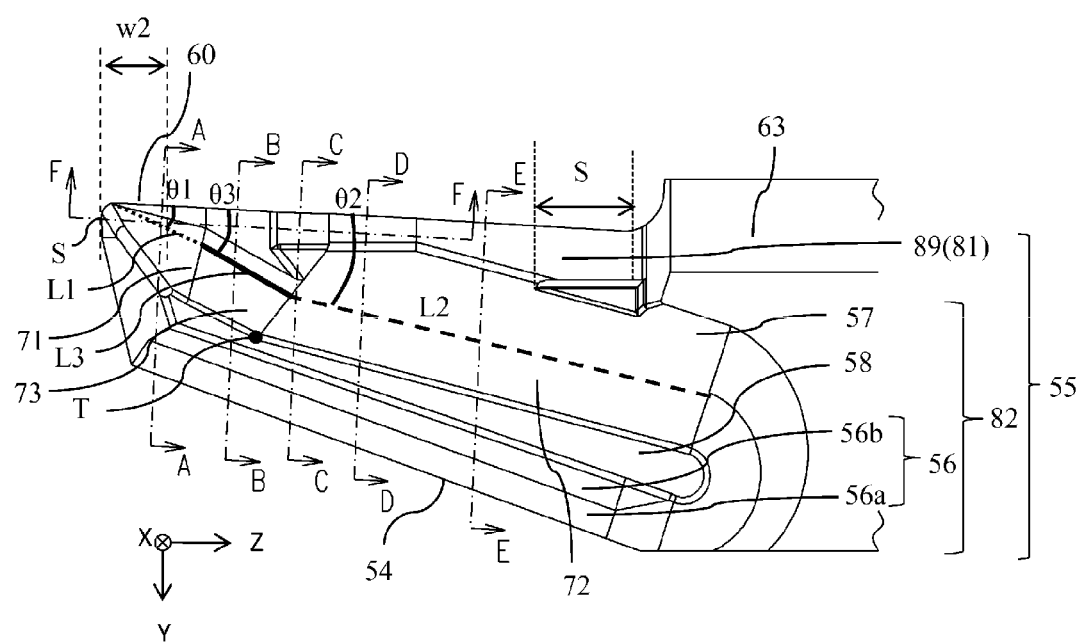
FIG. 7 is an enlarged view of the main part of the cutting insert in FIG. 6A.

As illustrated in FIG. 7, similar to the first embodiment, the ascending surface 57 of the breaker groove 55 on the side of the front cutting edge 53 includes a front wall surface 71 facing the front cutting edge 53, and the ascending surface 57 of the breaker groove 55 on the side of the lateral cutting edge 54 includes a lateral wall surface 72 facing the lateral cutting edge 54.

Further, according to FIG. 7, the breaker groove 55 further includes an intermediate wall surface 73 between the front wall surface 71 and the lateral wall surface 72. An opening angle θ3 from the rake face end 60 of the intermediate wall surface 73 (hereinafter also abbreviated "opening angle θ1") is greater than the opening angle θ1. This configuration makes it possible to decrease an excessive increase in the opening angle θ1 of the front wall surface 71 and thus reduce cutting resistance, and decrease a flow of chips in the direction of the rake face end 60 by the intermediate wall surface 73 having the opening angle θ3 greater than θ1. The preferred range of the opening angle θ3 is from 10 to 50°.

Here, in the present embodiment, the opening angle θ3 of the intermediate wall surface 73 is defined as the angle between a line L3 and the rake face end 60. As illustrated in FIG. 7, a line L3 (the bolded line) exists between the line L1 (the dotted line) for measuring the opening angle θ1 and the line L2 (the dashed line) for measuring the opening angle θ2 and connects positions of a height that is the same as the height of the lateral cutting edge 54 as viewed from above. That is, as in FIG. 7, the presence of the other line L3 between the line L1 and the line L2 in the top surface view defines that the intermediate wall surface 73 exists. Note that the intermediate wall surface 73 may be a flat surface or a curved surface. When the intermediate wall surface 73 is formed by a curved surface only, the opening angle θ3 is defined as the largest angle of the angles between a tangent of the line L3 and the rake face end 60.

The base portion 81, as illustrated in FIGS. 5, 8, and 9A to 9C, includes a first inclining base surface 84 that inclines and increases in height from a tip to a rear end, an intermediate base surface 85 that decreases in height or has the same height from a tip to a rear end, and a second inclining base surface 86 that inclines and increases in height from a tip to a rear end, in sequence from the side of the front cutting edge 53 along the rake face end 60. As a result, the insert 41 has a good chip-deforming effect, making it possible to smoothly discharge the chips.

Figure 11:
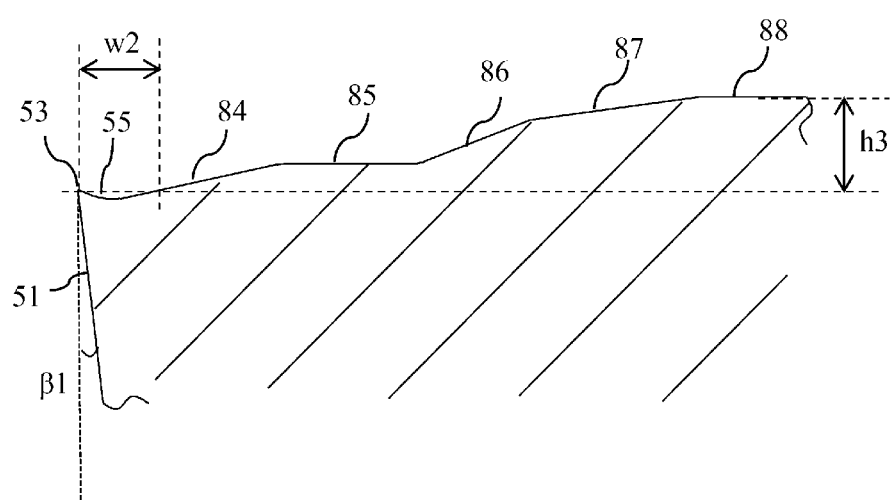
FIG. 11 is an F-F cross-sectional view of the cutting insert in FIG. 7.

Further, in the present embodiment, as illustrated in FIG. 11, a ratio (w2/h3) of a length (w2) to a height (h3) of the base portion 81 is from 0.3 to 6. The length (w2) is a length of the descending surface 56 of the breaker groove 55 at the point S in the frontmost position of the front cutting edge 53. When the ratio (w2/h3) is within this range, it is less likely to advance the chips produced from the side of the front cutting edge 13 to the side of the rake face end 60. The particularly preferred range of the ratio (w2/h3) is from 1 to 3.

On the side of the lateral cutting edge 54 in FIGS. 9A to 9C, the breaker groove 55 includes a breaker bottom surface 58 between the descending surface 56 and the ascending surface 57. The descending surface 56 on the side of the lateral cutting edge 54 includes a first descending surface 56a having a small downward angle, and a second descending surface 56b having a large downward angle. This configuration makes it possible to smoothly deform the chips as well as increase a thickness on the side of the lateral cutting edge 54 to enhance a strength on the side of the lateral cutting edge 54. Note that, in the present embodiment, the ascending surface 57 of the breaker groove 55 on the side of the lateral cutting edge 54 is formed by the lateral wall surface 72 only. Further, a breaker groove 75 may include negative land portions between the front cutting edge 53 and the descending surface 56, and between the lateral cutting edge 54 and the descending surface 56. Furthermore, the rake face 50 may include a rear connecting surface (not illustrated) having a small rising angle adjacent to the lateral wall surface 72, rearward from the ascending surface 57 on the side of the lateral cutting edge 54. An inclination angle γa of the first descending surface 56a is from 15 to 30°, and an inclination angle γb of the second descending surface 56b is from 25 to 45°. This configuration makes it possible to smoothly deform the chips as well as increase the thickness on the side of the lateral cutting edge 54 to enhance the strength on the side of the lateral cutting edge 54.

An inclination angle σ1 from a tip toward a rear end of the first inclining base surface 84 is from 5 to 10°, an inclination angle σ3 from the tip toward the rear end of the intermediate base surface 85 is from 0 to 5°, and an inclination angle σ2 from the tip to the rear end of the second inclining base surface 86 is from 10 to 35°. As a result, the chips deform more smoothly. According to FIG. 8, σ3 is 0°.

Figure 8:
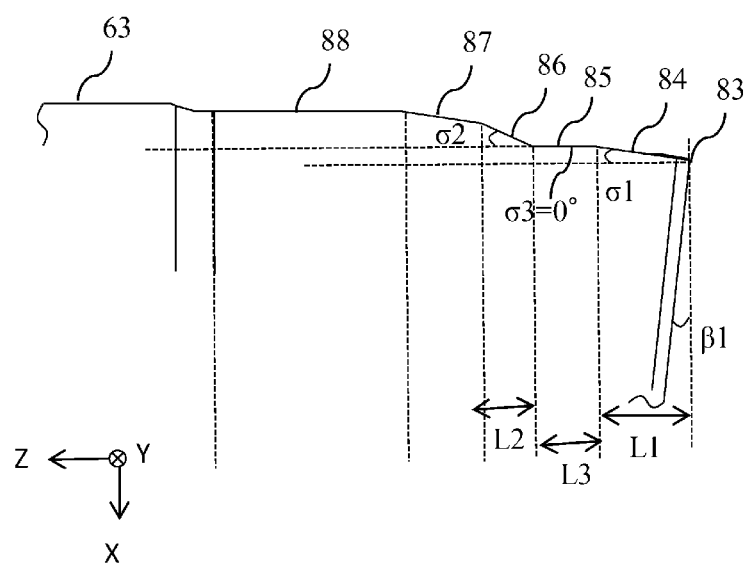
FIG. 8 is a side view of the cutting insert in FIG. 7 as viewed from the side of a rake face end.

As illustrated in FIG. 8, on the rake face end 60, a ratio (L3/L1) of a length L3 of the intermediate base surface 85 to a length L1 of the first inclining base surface 84 is from 0.3 to 0.8, and a ratio (L2/L1) of a length L2 of the second inclining base surface 86 to the length L1 of the first inclining base surface 84 is from 0.4 to 1. As a result, the chips deform more smoothly.

In the cross section orthogonal to the rake face end 60, at least a portion of the second inclining base surface 86 inclines and decreases in height from the rake face end 60 toward the cutting edge (lateral cutting edge 54). This configuration makes it possible to suitably deform and smoothly discharge the chips. According to FIG. 9C, the second inclining base surface 86 includes a second A inclining base surface 86a adjacent to the rake face end 60, and a second B inclining base surface 86b located between the second A inclining base surface 86a and the groove portion 82. The second A inclining base surface 86a has a constant height from the rake face end 60 in the direction toward the lateral cutting edge 54, and the second B inclining base surface 86b inclines and decreases in height from the rake face end 60 toward the lateral cutting edge 54. As a result, the chips that come into contact with the second B inclining base surface 86b deform more reliably.

A width of the second inclining base surface 86 partially increases and then decreases from the tip toward the rear end. In the present embodiment, a width of the second A inclining base surface 86a is constant from the tip toward the rear end, and a width of the second B inclining base surface 86b partially increases and then decreases from the tip toward the rear end. As a result, the chips come into contact with the second inclining base surface 86 and deform more reliably.

Figure 10A:
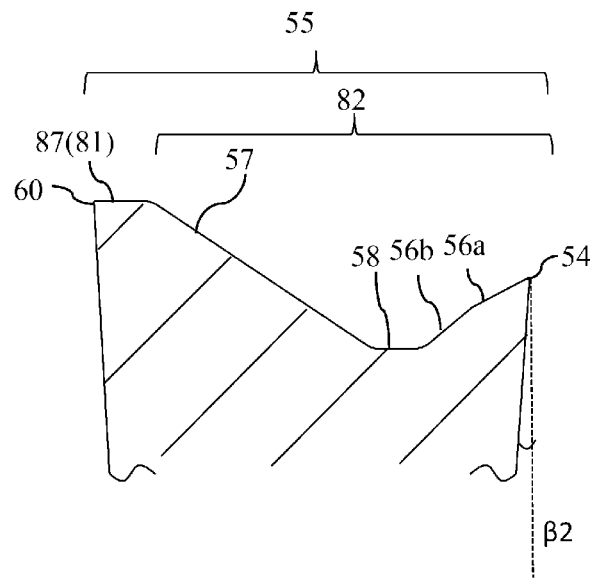
FIG. 10A is a D-D cross-sectional view of the cutting insert in FIG. 7.
Figure 10B:
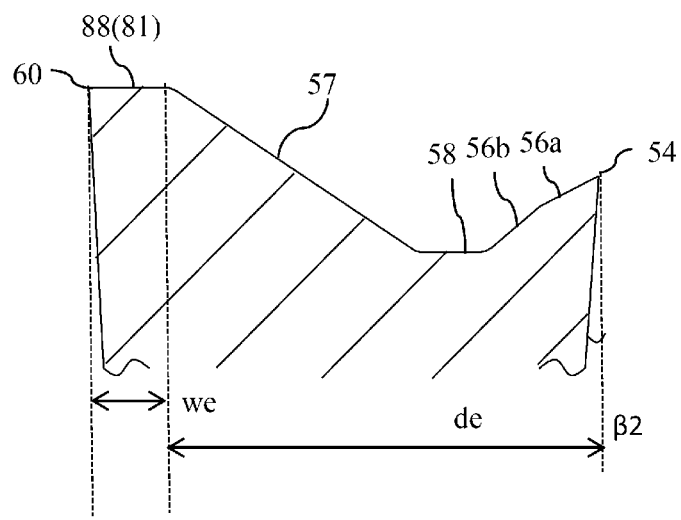
FIG. 10B is an E-E cross-sectional view of the cutting insert in FIG. 7.

In a cross section orthogonal to the rake face end 60 at a position of greatest width of the second inclining base surface 86 illustrated in FIG. 10A, a ratio (wc/dc) of a width wc of the second inclining base surface 86 to a width dc of the groove portion 82 is from 0.2 to 0.4. This ratio gives favorable balance between the base portion 81 and the groove portion 82 and makes it possible to deform the chips produced by the lateral cutting edge 54 as well as the chips produced by the front cutting edge 53.

The base portion 81 further includes a rearward base surface 87 having a width less than that of the second inclining base surface 86, rearward from the second inclining base surface 86. This configuration makes it possible to maintain a region of the groove portion 82 and temporarily store the chips in the groove portion 82. In a cross section orthogonal to the rake face end 60 at a tip position of the rearward base surface 87 illustrated in FIG. 9C, a ratio (we/de) of a width we of the rearward base surface 87 to a width de of the groove portion 82 is from 0.1 to 0.3. This ratio keeps the region of the base portion 81 from becoming too wide, making it possible to temporarily store the deformed chips and appropriately discharge the chips rearward. While the width of the rearward base surface 87 is the same as that of the second A inclining base surface 86a in the present embodiment, the width is not limited thereto.

The base portion 81 further includes a flat base surface 88 rearward from the rearward base surface 87, and a machining reference plane 89. The machining reference plane 89 is adjacent to the flat base surface 88 on the side of the lateral cutting edge 54 and on the rear side of the flat base surface 88. When the breaker groove 55 is fabricated by grinding, the flat base surface 88 is machined, causing the machining reference plane 89 to be inclined so as to decrease in height from the rake face end 60 toward the lateral cutting edge 54 and thus formed as illustrated in FIGS. 4A and 4B. The machining accuracy of the breaker groove 55 can be checked by checking a length of the width S formed by the machining of the flat base surface 88.

According to FIG. 7, the width of the breaker bottom surface 58 increases, partially decreases, and then increases again from the side of the front cutting edge 53 to the center portion (right side in FIG. 7) of the 46 top surface. Note that, in the present embodiment, the width of the breaker bottom surface 58 is defined as the width in the direction orthogonal to the rake face end 60, as viewed from the top surface. In the region in which the width of the breaker bottom surface 58 increases and then partially decreases, the cutting resistance of the front cutting edge 53 can be decreased, and the extension of chips to the side of the rake face end 60 is decreased. Further, in the region in which the width of the breaker bottom surface 58 increases more the side of the center portion than the position where the width partially decreases, the chips are bent and curled in the groove portion 82 and smoothly discharged.

When a position T, having the narrowmost width in the region where the width of the breaker bottom surface 58 partially decreases, exists on the intermediate wall surface 73 or a boundary between the intermediate wall surface 73 and the lateral wall surface 72, the cutting resistance of the front cutting edge 53 is low and chip dischargeability is favorable.

Method for Manufacturing a Machined Product

Figure 12A:
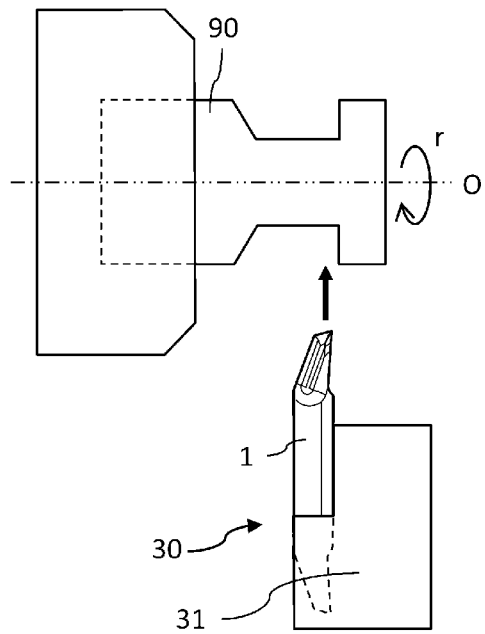
FIGS. 12A, 12B, 12C and 12D are diagrams for explaining a method for manufacturing a machined product according to the present embodiment, each being a schematic view illustrating one step of the manufacturing method.
Figure 12B:
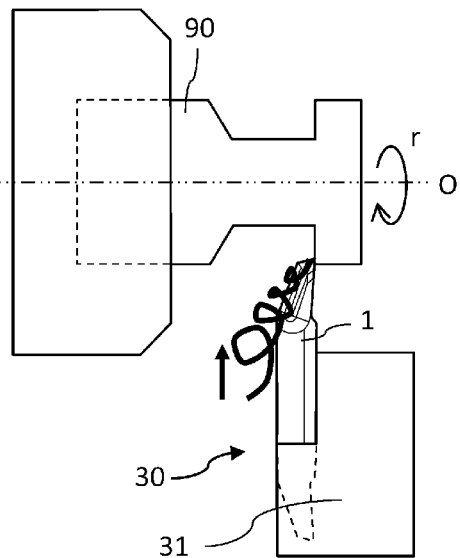
Figure 12C:
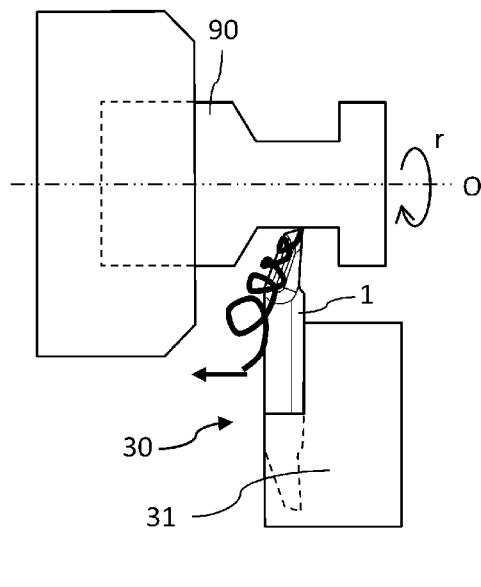
Figure 12D:
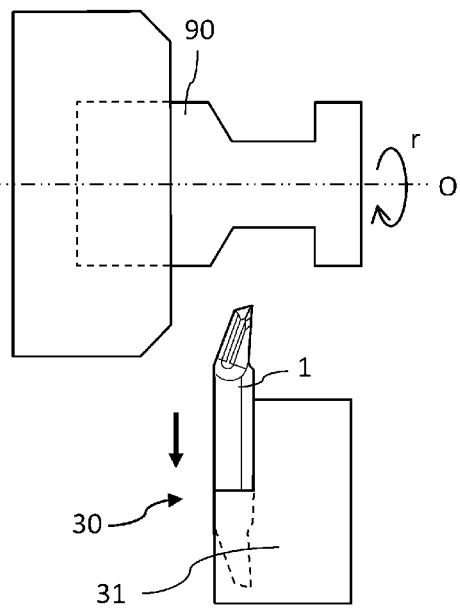
Figure 13:
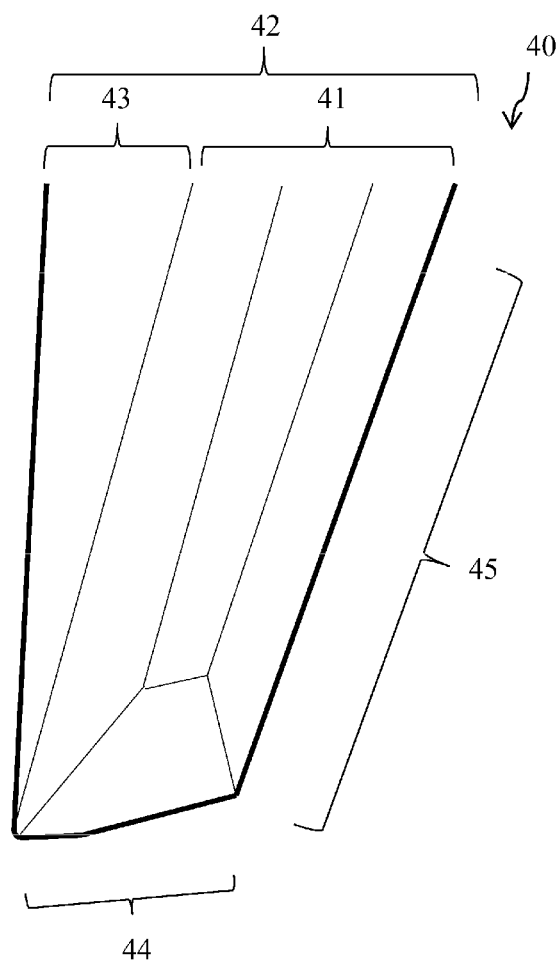
FIG. 13 is an enlarged view illustrating an example of a conventional cutting insert.

A detailed description will now be given of the method for manufacturing a machined product of the present embodiment with reference to FIGS. 12A to 12D. FIG. 12A is a diagram illustrating a step of bringing the cutting tool 30 provided with the cutting insert 1 mounted to the insert pocket 35 of the holder 31 close to a work material 90 in the direction Y. FIG. 12B is a diagram illustrating a step of bringing the cutting tool 30 into contact with the work material 90. FIG. 12C is a diagram illustrating a step of separating the cutting tool 30 from the work material 90 in the direction Z.

The method for manufacturing a machined product of the present embodiment includes the following steps (i) to (iV):

(i) Disposing the cutting tool 30 above the prepared work material 90 (FIG. 12A).

(ii) Rotating the work material in the arrow r direction about a rotation axis O, and bringing the cutting tool 30 close to the work material 90 (FIG. 12A). This step can, for example, be performed by fixing the work material 90 on a table of a machine tool having the cutting tool 30 attached thereto and, with the work material 90 rotating, bringing the cutting tool 30 close to the work material 90. Note that, in this step, the work material 90 and the cutting tool 30 may be brought close to each other relatively or, for example, the cutting tool 30 may be fixed and the work material 90 may be brought close to the cutting tool 30.

(iii) Bringing the cutting tool 30 closer to the work material 90, thereby causing the cutting edge 2 of the cutting tool 30 to come into contact with the surface of the rotating work material 90 at a predetermined position, and cutting the work material 90 (FIGS. 12B and 12C). During cutting, first, the side surface of the work material is subject to groove-forming in the vertical direction while the cutting tool 30 is moved to the tip side (FIG. 12B). Subsequently, the cutting tool performs back turning while being moved to the side of the lateral cutting edge of the insert 1 (FIG. 12C).

(iv) Separating the cutting tool 30 from the work material 90 (FIG. 9D). In this step as well, similar to the above step (ii), the work material 90 and the cutting tool 30 may be separated from each other relatively or, for example, the cutting tool 30 may be fixed and the work material 90 may be separated from the cutting tool 30.

According to the above steps, it is possible to exhibit good cutting performance. Note that, when the cutting is repeatedly performed, a step of bringing the cutting edge 9 of the cutting tool 30 into contact with different locations on the work material 90 may be repeated with the rotating state of the cutting tool 90 maintained.

The embodiments are described above. However, the present invention is not limited to the aforementioned embodiments, and naturally includes various modifications within a scope that does not deviate from the object of the present invention.

REFERENCE SIGNS LIST 1, 41 Cutting insert (insert)
2, 42 Insert body
3, 43 Cutting edge portion
4, 44 Through-hole
5, 45 First side surface
6, 46 Top surface
7, 47 Bottom surface
8, 48 Second side surface
9, 49 Cutting edge
10, 50 Rake face
11, 51 Front flank face
12, 52 Lateral flank face
13, 53 Front cutting edge
13a, 53a First front cutting edge
13b, 53b Second front cutting edge
14, 54 Lateral cutting edge
15, 55 Breaker groove
16, 56 Descending surface
17, 57 Ascending surface
18, 58 Breaker bottom surface
20, 60 Rake face end
21, 71 Front wall surface
22, 72 Lateral wall surface
73 Intermediate wall surface
25, 75 Rear connecting surface
30 Cutting tool
31 Holder
32 Screw
81 Base portion
82 Groove portion
84 First inclining base surface
85 Intermediate base surface
86 Second inclining base surface
86a Second A inclining base surface
86b Second B inclining base surface
87 Rearward base surface
88 Flat base surface
89 Machining reference plane
θ1 Opening angle of front wall surface
θ2 Opening angle of lateral wall surface
θ3 Opening angle of intermediate wall surface

The invention claimed is:

1. A cutting insert comprising:
a top surface;
a side surface;
a rake face located on the top surface;

a front flank face and a lateral flank face, both located on the side surface;
a cutting edge comprising:
a front cutting edge located at an intersecting part between the rake face and the front flank face; and
a lateral cutting edge located at an intersecting part between the rake face and the lateral flank face,
a breaker groove on the rake face, adjacent to the front cutting edge and the lateral cutting edge; and
a rake face end located on a side opposite the lateral cutting edge of the rake face,
wherein
the breaker groove comprises
a descending surface and an ascending surface disposed in sequence from a side of the front cutting edge and a side of the lateral cutting edge, respectively,
a front wall surface disposed on the ascending surface of the breaker groove on the side of the front cutting edge, and facing the front cutting edge, and
a lateral wall surface disposed on the ascending surface of the breaker groove on the side of the lateral cutting edge, and facing the lateral cutting edge, and,
wherein an opening angle θ1 from the rake face end of the front wall surface is greater than an opening angle θ2 from the rake face end of the lateral wall surface in the top surface view.

2. The cutting insert according to claim 1, wherein a ratio (h2/h1) of a height (h2) of the lateral wall surface to a height (h1) of the front wall surface is from 1 to 8.

3. The cutting insert according to claim 1, wherein a ratio (w/h1) of a length (w) to the height (h1) of the front wall surface is from 2 to 10, where the length (w) is a length of the descending surface of the breaker groove at a point in a frontmost position of the front cutting edge.

4. The cutting insert according to claim 1, wherein
the descending surface on the side of the lateral cutting edge comprises
a first descending surface and a second descending surface that are disposed in sequence from the side of the lateral cutting edge,
wherein the first descending surface has a downward angle γa, and
the second descending surface has a downward angle γb that is greater than the downward angle γa.

5. The cutting insert according to claim 1, further comprising an intermediate wall surface between the front wall surface and the lateral wall surface, wherein an opening angle θ3 from the rake face end of the intermediate wall surface is greater than the opening angle θ1.

6. The cutting insert according to claim 5, wherein
the opening angle θ3 from the rake face end of the intermediate wall surface is from 10 to 50°.

7. The cutting insert according to claim 6, further comprising
a breaker bottom surface between the descending surface and the ascending surface of the breaker groove,
wherein a width of the breaker bottom surface partially decreases in midway from the side of the front cutting edge, and increased therebeyond.

8. The cutting insert according to claim 6, wherein
a position of a narrowmost width of the breaker bottom surface in a region where the width of the breaker bottom surface partially decreases exists on the intermediate wall surface or a boundary between the intermediate wall surface and the lateral wall surface.

9. The cutting insert according to claim 5, wherein
the breaker groove further comprises:
a base portion adjacent to the rake face end; and
a groove portion adjacent to the base portion, extending to the cutting edge, and comprising a bend point between the groove portion and the base portion,
wherein the base portion comprises
a first inclining base surface that inclines and increases in height from a tip toward a rear end,
an intermediate base surface that decreases in height or has the same height from a tip toward a rear end, and
a second inclining base surface that inclines and increases in height from a tip to a rear end,
in sequence from the side of the front cutting edge along the rake face end.

10. The cutting insert according to claim 9, wherein
an inclination angle σ1 from the tip toward the rear end of the first inclining base surface is from 5 to 10°,
an inclination angle σ3 from the tip toward the rear end of the intermediate base surface is from 0 to 5°, and
an inclination angle σ2 from the tip to the rear end of the second inclining base surface is from 10 to 35°.

11. The cutting insert according to claim 9, wherein
a ratio (L3/L1) of a length L3 of the intermediate base surface to a length L1 of the first inclining base surface is from 0.3 to 0.8, and
a ratio (L2/L1) of a length L2 of the second inclining base surface to the length L1 of the first inclining base surface is from 0.4 to 1, on the rake face end.

12. The cutting insert according to claim 9, wherein at least a portion of the second inclining base surface inclines and decreases in height from the rake face end toward the cutting edge in a cross section orthogonal to the rake face end.

13. The cutting insert according to claim 9, wherein a width of the second inclining base surface partially increases and then decreases from the tip toward the rear end.

14. The cutting insert according to claim 9, wherein a ratio (wc/dc) of a width wc of the second inclining surface to a width dc of the groove portion is from 0.2 to 0.4 in a cross section orthogonal to the rake face end at a position of a greatest width of the second inclining base surface.

15. The cutting insert according to claim 9, wherein the base portion comprises a rearward base surface having a width less than that of the second inclining base surface, rearward from the second inclining base surface.

16. The cutting insert according to claim 15, wherein a ratio (we/de) of a width we of the rearward base surface to a width de of the groove portion is from 0.1 to 0.3 in a cross section orthogonal to the rake face end of the rearward base surface.

17. The cutting insert according to claim 9, wherein the base portion further comprises
a flat base surface rearward from the rearward base surface, and
a machining reference plane adjacent to the flat base surface, on the side of the lateral cutting edge, and on a rear side of the flat base surface.

18. A cutting tool comprising:
a holder comprising an insert pocket at a tip thereof; and
the cutting insert according to claim 1 mounted to the insert pocket.

19. A method for manufacturing a machined product, the method comprising:
   rotating a work material;
   bringing the cutting edge of the cutting tool according to claim 18 into contact with the work material that is rotating; and
   separating the cutting tool from the work material.

* * * * *